United States Patent
Che et al.

(10) Patent No.: US 6,763,090 B2
(45) Date of Patent: Jul. 13, 2004

(54) TELEPHONE SET WITH ON HOLD FUNCTION

(75) Inventors: Chiwei Che, Binfield (GB); Ya-Cherng Chu, Taipei (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 160 days.

(21) Appl. No.: 10/139,201

(22) Filed: May 6, 2002

(65) Prior Publication Data

US 2002/0191778 A1 Dec. 19, 2002

(30) Foreign Application Priority Data

May 8, 2001 (EP) .............................................. 01201668

(51) Int. Cl.[7] .............................................. H04M 1/64
(52) U.S. Cl. ................................................ 379/88.04
(58) Field of Search ........................ 379/201.01, 88.01, 379/88.04

(56) References Cited

U.S. PATENT DOCUMENTS

| | | | |
|---|---|---|---|
| 3,961,142 A | * | 6/1976 | Caffine ........................ 179/81 |
| 4,731,822 A | * | 3/1988 | Berry, III et al. ........... 379/204 |
| 5,003,587 A | * | 3/1991 | Forbes ........................ 379/393 |
| 5,148,471 A | | 9/1992 | Metroka et al. ............... 379/58 |
| 5,657,372 A | | 8/1997 | Ahlberg et al. ............. 455/414 |
| 6,031,905 A | * | 2/2000 | Furman et al. ............. 379/201 |
| 6,122,346 A | * | 9/2000 | Grossman ..................... 379/68 |
| 6,292,781 B1 | * | 9/2001 | Urs et al. ................. 379/93.09 |

FOREIGN PATENT DOCUMENTS

| | | | | |
|---|---|---|---|---|
| DE | 19636282 A | | 3/1998 | ............ H04M/1/00 |
| EP | 0851647 A2 | | 1/1998 | ............ H04M/1/64 |
| JP | 404181848 | * | 6/1992 | |
| WO | WO9931909 | | 6/1999 | ............ H04Q/7/22 |
| WO | WO9960765 | | 11/1999 | ............ H04M/1/66 |
| WO | WO0019688 | | 6/2000 | .......... H04M/1/725 |

* cited by examiner

Primary Examiner—Creighton Smith
(74) Attorney, Agent, or Firm—Ernestine C. Bartlett

(57) ABSTRACT

A telephone set starts ringing when receiving in incoming call. The user of the telephone set is able to give an on-hold user command given after start of said signaling. In response to the on-hold command the incoming call is placed automatically on-hold.

5 Claims, 1 Drawing Sheet

TELEPHONE SET WITH ON HOLD FUNCTION

FIELD OF THE INVENTION

The invention relates to a telephone set with an on-hold function.

BACKGROUND ART

Various techniques are known for responding to an incoming telephone call when a user has signaled that he or she is not able or willing to answer the call. From U.S. Pat. No. 6,055,305 for example, it is known to answer an incoming call automatically in this case. Similarly, it is possible to provide for an automatic answer when an incoming call is not picked up within a predetermined time interval.

These techniques all assume that the user will not be available for an indefinite period. Hence, automatic handling of the incoming call is directed at completion of the call.

In contrast, when the line is busy at the time of arrival of the incoming call, it may be assumed that the user will be available within the foreseeable future. Japanese patent application No. 2-142263 discloses how such an incoming call can be kept "on-hold" during the preceding call. The called user is notified of the incoming call during the preceding call and is enabled to press a response holding button, which causes a message to be sent to the caller that the incoming call is placed on-hold during the preceding call. Similarly, Japanese patent application No. 1-191549 allows the user to interject a voice command to place the telephone on hold during the conversation in the preceding call. These techniques have the advantage that the caller is not forced to call again if he or she wants to talk with the user.

Thus, the known techniques provide for incoming call termination when the user has signaled that he or she is not available and for an on-hold state for an incoming call that arrives during a preceding call. The situation where the user has to delay answering the incoming call at a time when he or she is not engaged in a call, is not addressed. Normally, one would expect the user who is not engaged in a telephone call to pick up the telephone when receiving an incoming call, or to let the phone ring, but it has been found that there are situations where the user is so engaged that call can't be answered immediately or has his or hands so full that the call can't be answered immediately.

SUMMARY OF THE INVENTION

Amongst others, it is an object of the invention to provide for a telephone set that enables a user to delay answering the incoming call at a time when he or she is not on the telephone.

The invention provides for a telephone set, comprising
- an input for receiving a call setup message for an incoming call;
- an output for signaling the setup message to a user of the telephone set;
- a user interface supporting an on-hold user command given after start of said signaling and before the user answers the incoming call, the user interface responding to the on-hold user command by causing the incoming call to be placed automatically on-hold prior to establishment of a voice connection between the user and the incoming call.

According to the invention, the user is able to place the incoming call on-hold, i.e. to stop the telephone set from ringing, without yet answering the incoming call. Preferably, a signal is sent back to the caller that the user will answer the incoming call, but that he or she has to delay answering the call.

Preferably the user interface comprises a voice command unit arranged to receive the on-hold user command. Thus, the user can use his or her voice to put the incoming call on hold. Especially when the user does not have his or her hands free it is desirable to be able to put the call on hold without using the hands. In an embodiment the telephone set has an operating mode in which functions for normally answering the incoming call, other than putting the call on-hold, are only operated by one or more buttons. Thus a conventional button interface can be used at least for functions other than the on-hold command. Preferably, voice recognition for the on-hold function is switched on only upon receiving the incoming call and switched off again once the call is answered or placed on-hold, or after a predetermined time interval. Thus power consumption for the on-hold function is minimized.

BRIEF DESCRIPTION OF THE DRAWING

These and other advantageous aspects of the telephone set according to the invention will be described using the following figures

DETAILED DESCRIPTION OF AN EMBODIMENT

Figure 1:
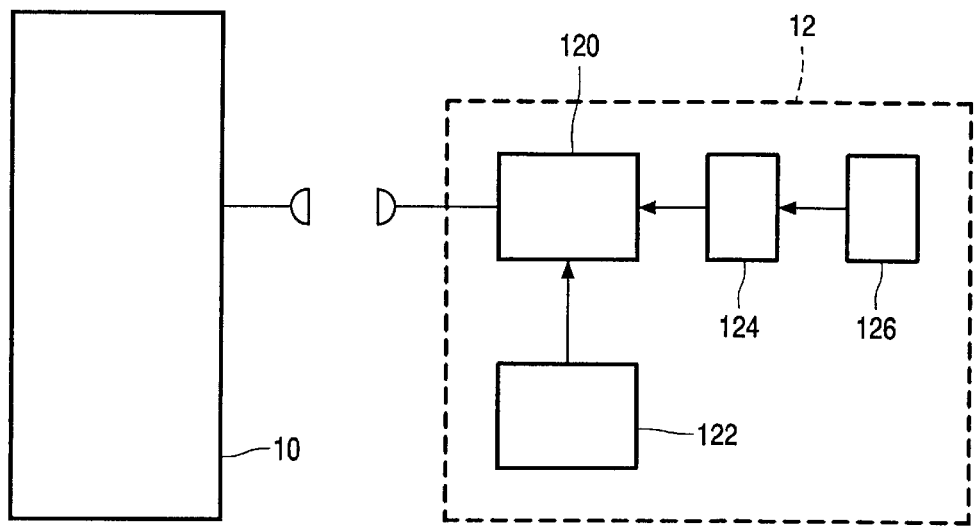
FIG. 1 shows part of a telephone system

FIG. 1 shows part of a telephone system. The system contains a base station 10 and a telephone set 12 (without deviating from the invention an exchange with a fixed connection to the telephone set 12 may be used). The telephone set 12 contains a control unit 120, a ringing unit 122, a voice input unit 126 and a voice recognition unit 124.

Figure 2:
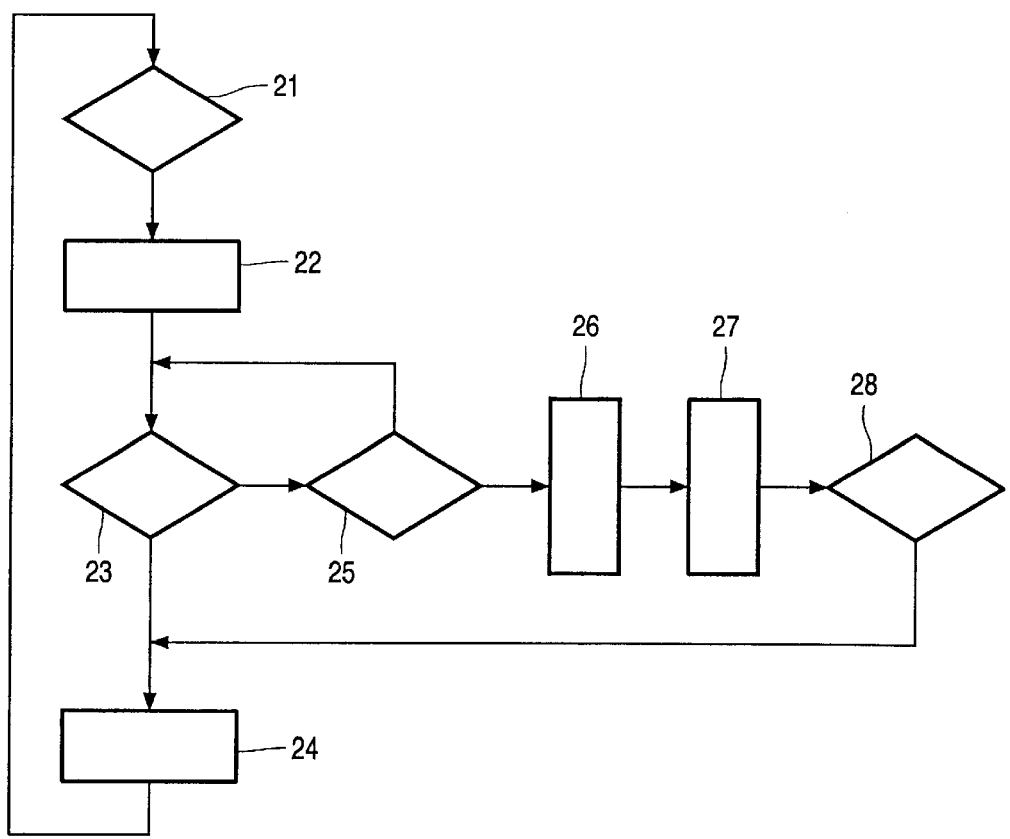
FIG. 2 shows a flow chart for processing an incoming telephone call

FIG. 2 shows a flow chart for processing an incoming telephone call.

In operation, the control unit 120 monitors in a first step 21 of the flow-chart whether a set-up message for an incoming call is received. This continues until such a set-up message is received. If so, the control unit 120 executes a second step 22 which causes the ringing unit 122 to start signaling to the user that an incoming call is available, for example by ringing or vibrating (in the following both will be referred to as "ringing" for the sake of brevity). (Herein, the person handling the telephone set 12 will be generally referred to as the "user", irrespective of whether this person actually owns the telephone set 12 or is responsible for paying for the use of it).

In a third step 23, the control unit 120 monitors whether the user has picked-up the call. If so, control unit 120 executes a fourth step 24, instructing the ringing unit 122 to stop ringing, answering the call set-up message, causing the telephone set 12 to establish a voice telephone connection for the incoming call via the telephone set 12. At the end of the fourth step, the end of the call is processed and the control unit returns to an initial state, executing the first step waiting for a new incoming call.

If the control unit 120 does not detect in the third step that the user has picked-up the call, control unit 120 executes a fifth step 25 to determine whether the user has activated the on-hold function in response to the ringing signal. For this purpose voice input unit 126 (typically a microphone) inputs audio information. Voice recognition unit 124 recognizes whether this audio information contains a spoken command to put the call on hold, for example the words "hold-it", or "wait" or some similar words. Preferably, the voice recognition is user dependent, so that only commands from the official user of the telephone set will be recognized, but without deviating from the invention speaker independent recognition may be used. Control unit 120 detects in the first step 25 whether voice recognition unit 124 outputs such a command. It should be noted that the fifth step 25 detects an activation of on-hold that occurs after the start of ringing (initiated in the second step 22).

If activation of the on-hold function is not detected, the control unit 120 repeats from the third step 23. If the control unit 120 detects activation of the on-hold function, it executes a sixth step 26, instructing the ringing unit 122 to stop ringing. Subsequently (or prior to the sixth step) control unit 120 executes a seventh step 27 signaling back to the calling subscriber that the telephone set is in the on-hold mode. Preferably, a special signal is used, which indicates that the on-hold function has been activated after reception of the start-up message. This informs the calling subscriber that the user is available near his or her telephone set and intends to answer the call, but is temporarily not available.

Preferably, the voice recognition unit 124 is switched on only upon receiving the incoming call, for example in the second step 22 and switched off again when the call is answered (in the fourth step 24) or when the telephone set is put on hold (in the seventh step 27). Thus, a minimum of energy is lost to provide the on-hold function. In an embodiment, the voice recognition unit 124 is switched off after a predetermined of time when the call is neither answered nor put on-hold. This predetermined time is preferably so long as to give the user an opportunity to put the call on hold, for example between 4 and 20 seconds. However, the telephone set will automatically be disabled anyway when the caller gives up and retracts the call.

During the on-hold mode, the incoming call is preferably kept in abeyance until the user picks-up the telephone. During an eight step 28, the control unit 120 tests whether the user picks up the telephone. If so the control unit 120 executes the fourth step 24. Otherwise, the control unit 120 keeps repeating the eight step 28.

Only the steps necessary for understanding the invention have been shown in FIG. 2. Without deviating from the invention other steps may be added. For example, if the calling subscriber breaks off the call while the control unit 120 is repeating the eight step, the control unit 120 will preferably return to an initial state, clearing the on-hold state and start waiting for a new incoming call. Thus, the user is enabled to decide for each incoming call whether or not to activate on-hold.

Similarly, the control unit 120 may cause the telephone set to start ringing again if it does not detect that the user answers the call after executing the eight step 28 for a predetermined time. This can be realized by returning from the eight step 28 to the second step 22 if the eight step 28 does not branch to the fourth step 24 within a predetermined time. Thus, the user will be periodically reminded of the incoming call that has been placed on hold. The user may be required to put the call on hold again, or the telephone set may simply ring for a brief period and thereafter return to the eight step.

Although the invention has been illustrated for a mobile phone using voice control, it will be appreciated that the invention can also be practiced in wired telephone set and by using other interface media, such as a push button, control by whistling sounds or hand clapping. However, it should be noted that mode wherein voice control is used for the on-hold function has a special advantage, even if all or most other functions of the telephone set are only controlled by buttons in that mode (this mode may be a permanent mode, or a mode to which the telephone set can be switched). This is because the described on hold function is typically needed under circumstances where the user does not have his or her hands available to operate the telephone set so as to answer the incoming call in the normal way.

Although it is preferred that the voice recognition unit 124 is included in the telephone set 12, it will be understood that, without deviating from the invention a voice recognition unit elsewhere in the telephone system 10 may be used. In this case control units passes voice commands from the input 126 to the voice recognition unit and receives back voice recognition results. Preferably user dependent voice recognition is used, so that normally only a predetermined user of the telephone set will be able to operate the on-hold function.

The control unit 122 and the recognition unit may be realized as one suitably programmed general purpose computer, or as different computers or as dedicated hardware units.

What is claimed is:

1. A television set, comprising
   an input for receiving a call setup message for an incoming call;
   an output for signaling the setup message to a user of the telephone set;
   a user interface supporting an on-hold user command given after start of said signaling and before the user answers the incoming call and having a voice command unit arranged to receive the on-hold user command, the user interface responding to the on-hold user command by causing the incoming call to be placed automatically on-hold prior to establishment of a voice connection between the user and the incoming call.

2. A telephone set according to claim 1, having an operating mode in which functions for normally answering the incoming call, other than putting the call on-hold, are operated by one or more buttons, not by voice control.

3. A telephone set according to claim 2, wherein the voice command unit is switched on upon said set-up message and switched off in response to the user answers the call or giving the on-hold user command.

4. A telephone set according to claim 1, wherein the telephone set signals back an on-hold message to the incoming call in response to the on-hold user command, the on-hold message being specific to execution of the on-hold user command received after the start of said signaling.

5. A telephone set according to claim 1, the telephone set being a mobile telephone set.

* * * * *